United States Patent
Ness et al.

(10) Patent No.: US 11,018,860 B2
(45) Date of Patent: May 25, 2021

(54) HIGHLY AVAILABLE AND RELIABLE SECRET DISTRIBUTION INFRASTRUCTURE

(71) Applicant: Microsoft Technology Licensing, LLC, Redmond, WA (US)

(72) Inventors: Andy Ness, Redmond, WA (US); Catherine Amy McDonald, Redmond, WA (US); Jeffrey E. Steinbok, Redmond, WA (US); Prajakta Sudhir Samant, Redmond, WA (US); Tyler Pennington, Redmond, WA (US); Nicola Alfeo, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 159 days.

(21) Appl. No.: 15/600,040

(22) Filed: May 19, 2017

(65) Prior Publication Data
US 2018/0123791 A1 May 3, 2018

Related U.S. Application Data

(60) Provisional application No. 62/414,524, filed on Oct. 28, 2016.

(51) Int. Cl.
*H04L 9/08* (2006.01)
*H04L 29/06* (2006.01)
(Continued)

(52) U.S. Cl.
CPC ............ *H04L 9/0897* (2013.01); *H04L 9/083* (2013.01); *H04L 9/0827* (2013.01);
(Continued)

(58) Field of Classification Search
None
See application file for complete search history.

(56) References Cited

U.S. PATENT DOCUMENTS

| 5,852,724 A | 12/1998 | Glen et al. |
| 6,185,695 B1 | 2/2001 | Murphy et al. |

(Continued)

FOREIGN PATENT DOCUMENTS

| CN | 103532952 A | 1/2014 |
| WO | 2014139403 A1 | 9/2014 |
| WO | 2018080950 A1 | 5/2018 |

OTHER PUBLICATIONS

"International Search Report and Written Opinion Issued in PCT Application No. PCT/US2017/057776", dated Dec. 19, 2017, 12 Pages.

(Continued)

*Primary Examiner* — Jason Chiang

(57) ABSTRACT

The techniques discussed herein relate to providing a highly available and reliable secret distribution infrastructure. In an implementation, a key master service (KMS) system is disclosed. The KMS system includes one or more computer readable storage media having program instructions stored thereon which, when executed by one or more processing systems, direct the one or more processing systems to identify a hydration event and, responsive to the hydration event, determine if other KMS systems are running in a secret distribution infrastructure. The program instructions, when executed by one or more processing systems, further direct the KMS system to hydrate the KMS system with secret information obtained from the one or more of the other KMS systems when the other KMS systems are running in the secret distribution infrastructure.

17 Claims, 7 Drawing Sheets

(51) Int. Cl.
  *H04L 29/08* (2006.01)
  *H04W 12/06* (2021.01)
  *H04L 9/32* (2006.01)

(52) U.S. Cl.
  CPC ............ *H04L 9/0891* (2013.01); *H04L 9/321* (2013.01); *H04L 9/3263* (2013.01); *H04L 29/0617* (2013.01); *H04L 63/0272* (2013.01); *H04L 63/062* (2013.01); *H04L 63/0823* (2013.01); *H04L 67/1095* (2013.01); *H04L 67/40* (2013.01); *H04W 12/0608* (2019.01); *G06F 2221/0753* (2013.01); *G06F 2221/0788* (2013.01); *G06F 2221/0793* (2013.01); *H04L 63/083* (2013.01); *H04L 63/0807* (2013.01); *H04L 63/12* (2013.01)

(56) References Cited

U.S. PATENT DOCUMENTS

| | | | |
|---|---|---|---|
| 8,019,900 | B1 | 9/2011 | Sekar et al. |
| 8,539,231 | B1 | 9/2013 | Durgin et al. |
| 8,908,868 | B1 | 12/2014 | Baer et al. |
| 9,071,429 | B1* | 6/2015 | Roth ............. H04L 9/0894 |
| 9,276,754 | B1 | 3/2016 | Baer et al. |
| 9,379,890 | B1* | 6/2016 | Blakely ............ H04L 9/0822 |
| 2006/0078124 | A1 | 4/2006 | Whelan et al. |
| 2007/0179989 | A1 | 8/2007 | Maes |
| 2008/0130880 | A1 | 6/2008 | Frindell et al. |
| 2010/0202617 | A1* | 8/2010 | Balakrishnan ........ G06F 21/575 380/277 |
| 2010/0208898 | A1* | 8/2010 | Acar ............. H04L 9/0833 380/280 |
| 2010/0316219 | A1 | 12/2010 | Boubion et al. |
| 2011/0295656 | A1 | 12/2011 | Venkatasubramanian et al. |
| 2012/0151563 | A1 | 6/2012 | Bolik et al. |
| 2013/0055295 | A1 | 2/2013 | Dayka et al. |
| 2013/0067213 | A1 | 3/2013 | Liu |
| 2013/0259234 | A1* | 10/2013 | Acar ............. H04L 9/0833 380/278 |
| 2013/0263250 | A1 | 10/2013 | Leckey et al. |
| 2014/0003608 | A1 | 1/2014 | MacMillan et al. |
| 2014/0074539 | A1 | 3/2014 | Doering et al. |
| 2014/0164790 | A1* | 6/2014 | Dodgson ............ G06Q 10/10 713/193 |
| 2014/0165167 | A1 | 6/2014 | Nunn et al. |
| 2014/0189432 | A1 | 7/2014 | Gokhale et al. |
| 2014/0325591 | A1 | 10/2014 | Delia et al. |
| 2015/0052358 | A1 | 2/2015 | Udupi et al. |
| 2015/0143115 | A1 | 5/2015 | Gupta et al. |
| 2015/0178504 | A1* | 6/2015 | Nystrom ............ G06F 9/45533 713/2 |
| 2015/0222604 | A1 | 8/2015 | Ylonen |
| 2015/0310221 | A1 | 10/2015 | Lietz et al. |
| 2016/0028714 | A1 | 1/2016 | Umberger et al. |
| 2016/0050191 | A1* | 2/2016 | Alt ............. H04L 63/0853 726/4 |
| 2016/0105283 | A1 | 4/2016 | Mityagin |
| 2016/0170783 | A1* | 6/2016 | Bhogal ............. H04L 67/2842 718/1 |
| 2016/0210205 | A1 | 7/2016 | Mcalister et al. |
| 2017/0141916 | A1 | 5/2017 | Zhang |
| 2018/0006815 | A1* | 1/2018 | Young ............. G06F 12/1408 |

OTHER PUBLICATIONS

Buda, Bradley, "Like Magic, Meldium Can Change Your Passwords For You", http://blog.meldium.com/home/2014/6118/change-your-bad-passwords-in-one-place, Published on: Jun. 23, 2014, 4 pages.
"Automatic Password Rotation", https://www.clickstudios.com.au/blog/automatic-password-rotation/, Published on: Jun. 4, 2013, 6 pages.
Brauer, Ben, "How to Rotate Access Keys for IAM Users", https://aws.amazon.com/blogs/security/how-to-rotate-access-keys-for-iam-users/, Published on: Oct. 2, 2013, 8 pages.
Kazarian, Jason Paul, "Securing big data in the IoT age: Why dynamic key management is key", http://techbeacon.com/securing-big-data-iot-age-why-dynamic-key-management-key, Published on: Sep. 19, 2016, 12 pages.
"Scheduled Password Rotation", http://web.archive.org/web/20110527234413/http:/www.manageengine.com/products/passwordmanagerpro/help/scheduled_password_rotation.html, Published on: May 27, 2011, 3 pages.
Gutmann, Peter, "A Reliable, Scalable General-purpose Certificate Store", In Proceedings of 16th Annual Conference Computer Security Applications, Dec. 2000, pp. 278-287.
Decandia, et al., "Dynamo: amazon's highly available key-value store", In Proceedings of twenty-first ACM SIGOPS symposium on Operating systems principles, Oct. 14, 2007, pp. 205-220.
Bills, et al., "Deploying highly available and secure cloud solutions", http://download.microsoft.com/download/2/E/A/2EAE4339-3446-4D69-6784-E35A716681E7/Deploying_Highly_Available_and_Secure_Cloud_Solutions.pdf, Published on: Dec. 2012, 24 pages.
"The Seven Standards of Cloud Computing Service Delivery", In White Paper of sales force, Mar. 15, 2007, 4 pages.
Salas, et al., "WS-replication: a framework for highly available web services", In Proceedings of the 15th international conference on World Wide Web, May 23, 2006, pp. 357-366.
Saito, et al., "Manageability, Availability, and Performance in Porcupine: A Highly Scalable, Cluster-Based Mail Service", In Journal of ACM Transactions on Computer Systems, vol. 18 Issue 3, Aug. 2000, 298-332 pages.
Ping et al., "Wide area placement of data replicas for fast and highly available data access", In Proceedings of the fourth international workshop on Data-intensive distributed, Jun. 8, 2011, pp. 1-8.
"International Search Report and Written Opinion Issued in PCT Application No. PCT/US2017/057785", dated Dec. 18, 2017, 12 Pages.
"Final Office Action Issued in U.S. Appl. No. 15/600,129", dated Aug. 20, 2019, 20 Pages.
"Non Final Office Action Issued in U.S. Appl. No. 15/600,129", dated Apr. 3, 2019, 16 Pages.
"Office Action Issued in Colombian Application No. NC2019/0003766", dated Apr. 23, 2019, 1 Page. (W/O English Translation).
"Written Opinion Issued in Singapore Patent Application No. 11201903338W", dated Jun. 2, 2020, 5 Pages.
"Non-Final Office Action Issued in U.S. Appl. No. 15/600,129", dated Apr. 14, 2020, 20 Pages.
"Office Action Issued in Chile Patent Application No. 201901042", dated Sep. 4, 2020, 13 Pages.
"Office Action Issued in Colombian Patent Application No. NC2019/0003766", dated Sep. 15, 2020, 23 Pages.
"First Office Action and Search Report Issued in Chinese Patent Application No. 201780066686.6", dated Dec. 3, 2020, 17 Pages.
"Office Action Issued in Colombian Patent Application No. NC2019/0003766", dated Sep. 15, 2020, 14 Pages.

* cited by examiner

HIGHLY AVAILABLE AND RELIABLE SECRET DISTRIBUTION INFRASTRUCTURE

CROSS REFERENCE TO RELATED APPLICATIONS

This claims priority to and benefit from U.S. Provisional Patent Application Ser. No. 62/414,524, filed on Oct. 28, 2016, titled "HIGHLY AVAILABLE AND RELIABLE SECRET DISTRIBUTION INFRASTRUCTURE," which is expressly incorporated by reference herein.

BACKGROUND

Various online applications, services and sites such as, for example, Microsoft OneDrive® require secret information to provide access to client devices. In the past, online secret distribution infrastructures have maintained secret information in local data stores, e.g., files, or databases, or, in some instances, in other non-secure locations. Unfortunately, in addition to being unsecure, these local data stores are prone to failure.

Overall, the examples herein of some prior or related systems and their associated limitations are intended to be illustrative and not exclusive. Upon reading the following, other limitations of existing or prior systems will become apparent to those of skill in the art.

OVERVIEW

Examples discussed herein relate to providing a highly available and reliable secret distribution infrastructure. In an implementation, a key master service (KMS) system is disclosed. The KMS system includes one or more computer readable storage media having program instructions stored thereon which, when executed by one or more processing systems, direct the one or more processing systems to identify a hydration event and, responsive to the hydration event, determine if other KMS systems are running in a secret distribution infrastructure. The program instructions, when executed by one or more processing systems, further direct the KMS system to hydrate the KMS system with secret information obtained from the one or more of the other KMS systems when the other KMS systems are running in the secret distribution infrastructure.

Embodiments of the present invention also include computer-readable storage media containing sets of instructions to cause one or more processors to perform the methods, variations of the methods, and other operations described herein.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

Figure 1:
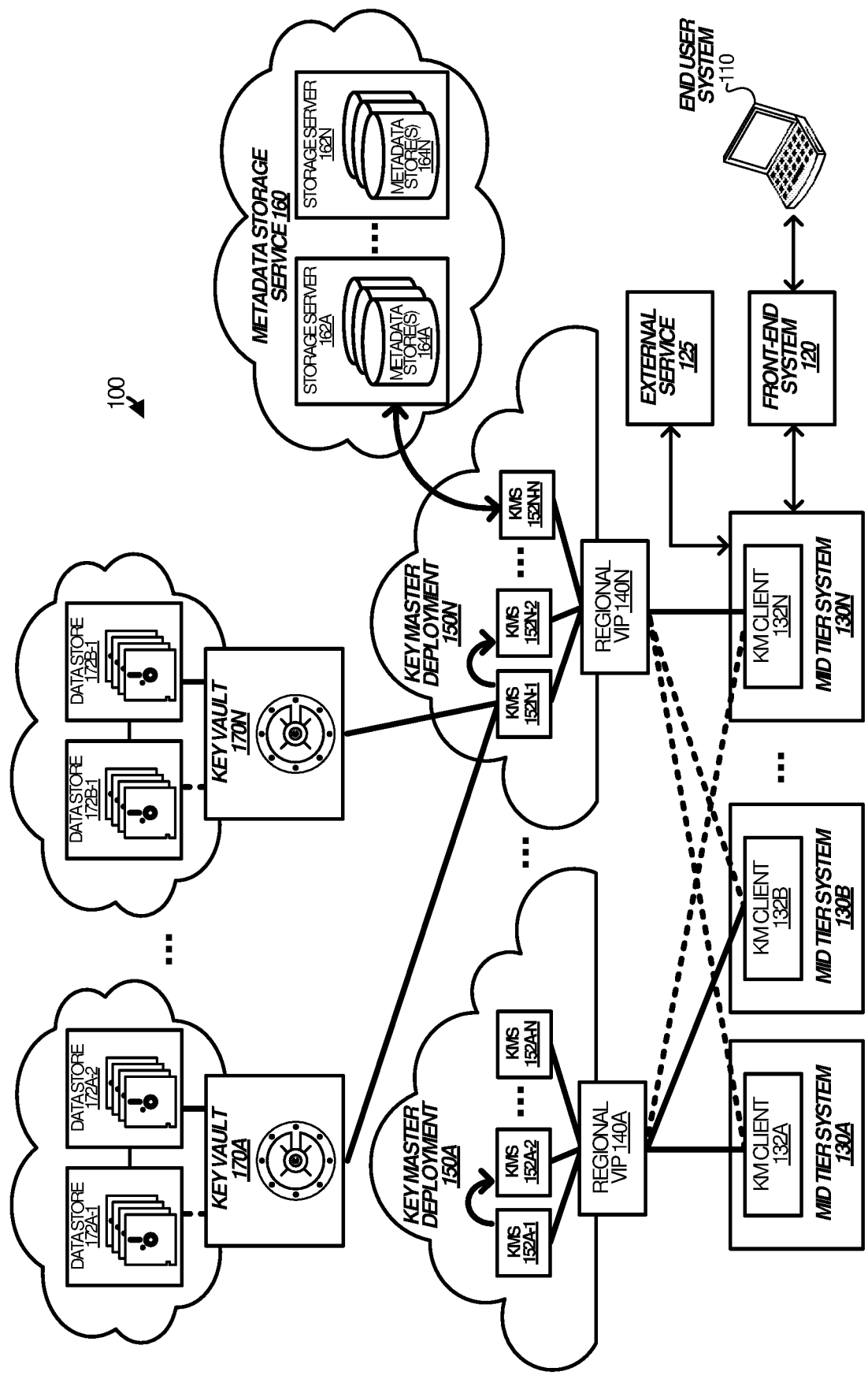
FIG. 1 depicts a block diagram illustrating an example operational architecture for providing a providing a highly available (HA) and reliable service infrastructure in accordance with some embodiments.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Examples are discussed in detail below. While specific implementations are discussed, it should be understood this is done for purpose of illustration only. A person skilled in the relevant art will recognize that other components and configurations may be used without parting from the spirit and scope of the subject matter of this disclosure. The implementations may be a machine-implemented method, a computing device, or a computer readable medium.

Techniques are described herein for providing a highly available and reliable secret storage and distribution infrastructure. The infrastructure is configured to provide secret information to underlying application, services or sites with high availability and resilience to failing of one or more dependent components. Importantly, the infrastructure allows a key master service to instantiate itself and populate internal data structures from various unorthodox sources to maintain the high availability. Among other benefits, the secret storage and distribution infrastructure can withstand multiple sources of failure. For example, in scenarios where multiple data dependencies are down or unavailable, the system can identify other places where the information is stored and can initialize or instantiate using data obtained from those other or secondary sources.

In some embodiments, a highly available key master service (KMS) system is described. The KMS system delivers secret information, e.g., certificates, passwords, keys, logins, domain accounts, etc., to clients utilizing the highly available service infrastructure. As discussed herein, if the KMS system cannot return a requested secret information, then an application, site or service cannot function. The secret and distribution infrastructure securely stores the secret information in a key vault, e.g., Azure KeyVault, and metadata describing the secret information in a metadata database, e.g., Azure SQL. At any given point in time, either of these external dependencies can fail and the various KMS systems can still obtain necessary secret information or data from other KMS systems to deliver secret information.

Among other benefits, the techniques discussed herein facilitate at least the following technical effects: 1) improved security, 2) high availability when one or more external dependencies fail, e.g., metadata system or key vault, and 3) a reduced backend footprint, e.g., high availability with fewer key vault and metadata instances.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to supporting microservices as native functions in spreadsheet applications, embodiments of the present technology are equally applicable to various other applications such as locating equipment.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

FIG. 1 depicts a block diagram illustrating an example operational architecture 100 in accordance to some embodiments. More specifically, the example operational architecture 100 comprises a highly available and reliable secret storage and distribution infrastructure.

As shown in the example of FIG. 1, operational architecture 100 includes multiple key vaults 170a-170n, multiple key master deployments 150a-150n each having multiple KMS systems 152a-1-152n-n, multiple regional VIP systems 140a-140n, at least one metadata storage service 160, multiple mid-tier systems 130a-130n, an external service 125, a front-end system 120, and an end user system 110. The mid-tier systems 130a-130n are configured to execute corresponding key master (KM) clients 132a-132n for associated applications, sites or services, e.g., online or cloud-based applications, services or sites such as, for example, Microsoft OneDrive®.

An end user system 110 can access an external service 125 through a front-end system 120. The front-end system 120 requests access to the external service 125 via a mid-tier system 130 of the mid-tier systems 130a-130n and, more particularly, a key master client 132 running on the mid-tier system 130. The key master client 132 requests secret information from a KMS system 152 of the multiple KMS systems 152a-1-152n-n. Once the secret information is returned to the front-end system 120, access to the external service 125 can be granted and a connection established. An example is shown and discussed in greater detail with reference to FIG. 3.

The front-end system 120 can include GUIs (graphical user interface) running on a PC, mobile phone device, a Web server, or even other application servers. Such systems may employ one or more virtual machines, containers, or any other type of virtual computing resource. The front-end system 120 accesses a mid-tier system 130 of the mid-tier systems 130a-130n to obtain the requested information.

A key master client 132 running on the mid-tier system 130 requests secret information from a KMS system 152 of the multiple KMS systems 152a-1-152n-n deployed in the multiple key master deployments 150a-150n. As discussed herein, the KMS systems 152a-1-152n-n maintain secret information necessary for accessing the various external services, applications or sites. Accordingly, at least one of the KMS systems 152a-1-152n-n needs to be up and running for and end user system 110 to access the external service 125. The KMS systems 152a-1-152n-n provide (or deliver) requested secret information to key master clients 132a-132n running on the mid-tier systems 130a-130n responsive to requests when the KMS systems 152a-1-152n-n are hydrated with the secret information. In some embodiments, the key master clients 132a-132n cache the received secret information.

The secret information is stored in the key vaults 170a-170n and the corresponding metadata associated with the secret information is stored in the metadata storage service 160. The metadata storage service 160 can include multiple storage servers 162a-162n that can be physically and/or functionally distributed. The storage servers 162a-162n each include one or more metadata stores 164. In some embodiments, a metadata store is, for example, an Azure SQL database. The metadata stores 164 can store multiple copies of the metadata for redundancy. Additional or secondary metadata stores located in different regions are also possible. In some embodiments, each write comprises an update to the metadata.

Each key vault 170 can include multiple copies of the data, e.g., in data stores 172. Additionally, the multiple redundant key vaults 170a-170n can be included in separate regions, e.g., physically distributed.

As discussed above, the key master deployments 150a-150n each include multiple instances of KMS systems. The key master deployments may be functionally and/or physically distributed. Each key master deployment 150 is accessible via a corresponding key master service regional VIP 140 that serves and acts as an access point for the KMS systems operating within that key master deployment. The KMS systems are not redundant. Rather, many instances of the KMS systems are needed in the infrastructure to simultaneously service requests from many key master clients. Although not shown, the KMS systems may be load balanced. Typically, every KMS system has the same data so that each and every one can service any key master client. As discussed herein, the KMS systems are required to be highly available to deliver the secret information to the clients. If the KMS systems cannot return secret information, the external service 125 (services or sites) cannot function.

In some embodiments, caching is built into the key master clients to enable storage of received secret information until the machine reboots or polls for new data from a KMS system. The key master clients only have needed (requested and received) secret information, i.e., key master clients do not have all secret information.

Likewise, caching is built into each KMS system and, unlike a key master client, a KMS system can include secret information for an entire site or external service 125. When secret information changes (e.g., via rotation or a user updating a secret through the client tool), the KMS system writes the secret to the key vault and the secret metadata the metadata store. In some embodiments, an autopilot feature is also provided. The autopilot feature gradually deploys KMS system instances and ensures that only a certain percentage of machines (e.g., 25%) can be upgraded or rebooted at any given point in time. The autopilot feature ensures that the machines are given sufficient time to come into operation.

When a KMS system comes online, e.g., startup or restart, the KMS system needs to communicate with the metadata storage service 160 to obtain the metadata it needs and a key vault 170 to obtain secret information corresponding to the metadata. The process of obtaining secret information is referred to herein as hydration. Once up, other KMS systems can hydrate from the initial KMS system. Consequently, subsequent KMS systems can communication and hydrate without dependency on the metadata storage service 160, e.g., SQL Azure, or a key vault 170a-170n. That is, a KMS system can withstand either or both metadata storage service 160 or the key vault 170 going down and can still continue to deliver up-to-date secrets to the key master clients 132a-132n.

If the metadata storage service 160 or the key vaults 170a-170n go down while secrets are being updated, some KMS systems will have more up-to-date secret information than others. In this scenario, when a KMS system cannot poll the metadata storage service, the KMS will instead update its cache (or secret information) using information obtained from other KMS systems. Ultimately, a KMS system that has the latest version(s) of the secret information will be found and the other KMS systems will hydrate from this instance. Eventually the system comes to a steady state where all the KMSs have the same secret information.

Each KMS system may include server computers, blade servers, rack servers, and any other type of computing system (or collection thereof) suitable for carrying out the operations discussed herein. Likewise, the metadata storage servers and mid-tier systems may include server computers, blade servers, rack servers, and any other type of computing system (or collection thereof) suitable for carrying out the operations discussed herein.

Figure 2:
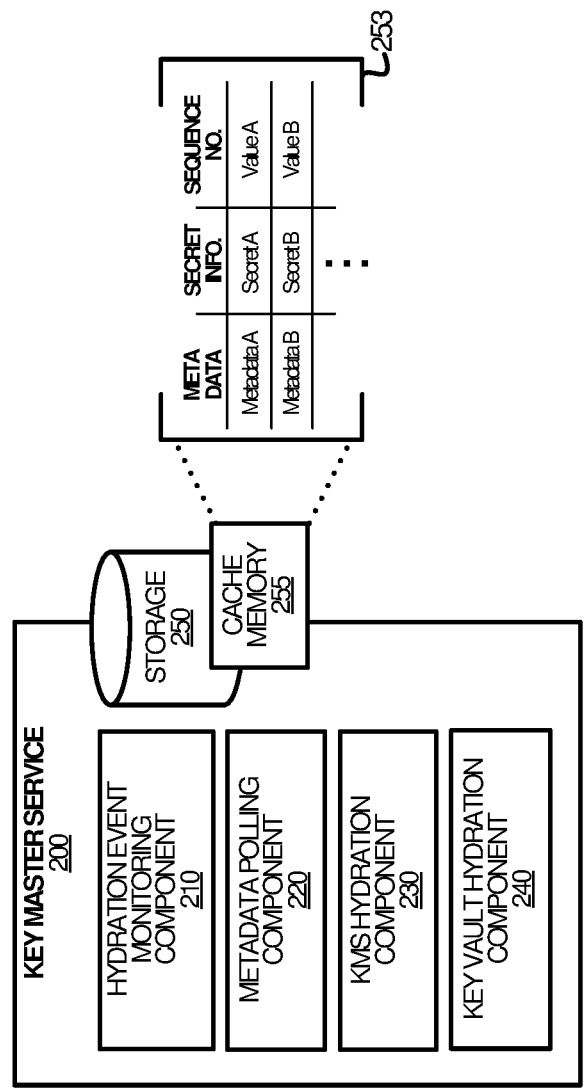
FIG. 2 depicts example components of a KMS system, according to some embodiments.

FIG. 2 depicts example components of a KMS system 200, according to some embodiments. The KMS system 200 can be one of the KMS systems 152 of FIG. 1, although alternative configurations are possible. The functions represented by the components, modules and/or engines described with reference to FIG. 2 can be implemented individually or in any combination thereof, partially or wholly, in hardware, software, or a combination of hardware and software.

As illustrated in the example of FIG. 2, the KMS system 200 includes a hydration event monitoring component 210, a metadata polling component 220, a KMS hydration component 230, a key vault hydration component 240, and a storage container 250 that includes cache memory 255. The cache memory 255 includes secret information table 253. Other systems, databases, and/or components are also possible.

The hydration event monitoring component 210 monitors for and detects and/or otherwise identifies hydration events. By way of example, a hydration event can include instantiation or restart of the KMS system.

The metadata polling component 220 monitors for and detects and/or otherwise identifies metadata polling triggers. As discussed herein, KMS system 200 polls the metadata storage service for new or updated secret information. The polling can be periodic, based on some triggering event or some combination or variation thereof. As discussed herein, every secret in the metadata storage service has an associated unique token or sequence number that identifies a state or version of the secret. In some instances, the token or sequence number increases each time the secret information is updated. Accordingly, if metadata storage service 160 or another KMS has a token (or sequence number) that is higher than the current token that a KMS has for a particular secret, then the KMS system 200 knows that its version of the secret information is out-of-date. This model is commonly referred to as a delta sync model.

The KMS hydration component 230 hydrates the KMS system 200 with secret information obtained from one or more KMS systems in a secret distribution infrastructure. For example, the KMS hydration component 230 first attempts to hydrate the KMS system 200 with secret information obtained from one or more of the other KMS systems when the other KMS systems are up and running in the secret distribution infrastructure. The key vault hydration component 240 hydrates the KMS system 200 with secret information obtained from one or more of the key vaults if the other KMS systems in the secret distribution infrastructure not up and running.

The storage container 250 includes memory for, among other things, storing data and program instructions. The storage container 250 also includes cache memory 255. Cache memory 255 includes a table 253 including cached secret information. More specifically, as shown in the example of FIG. 2, table 253 includes secret information, and metadata and a token or sequence corresponding to each secret.

Figure 3:
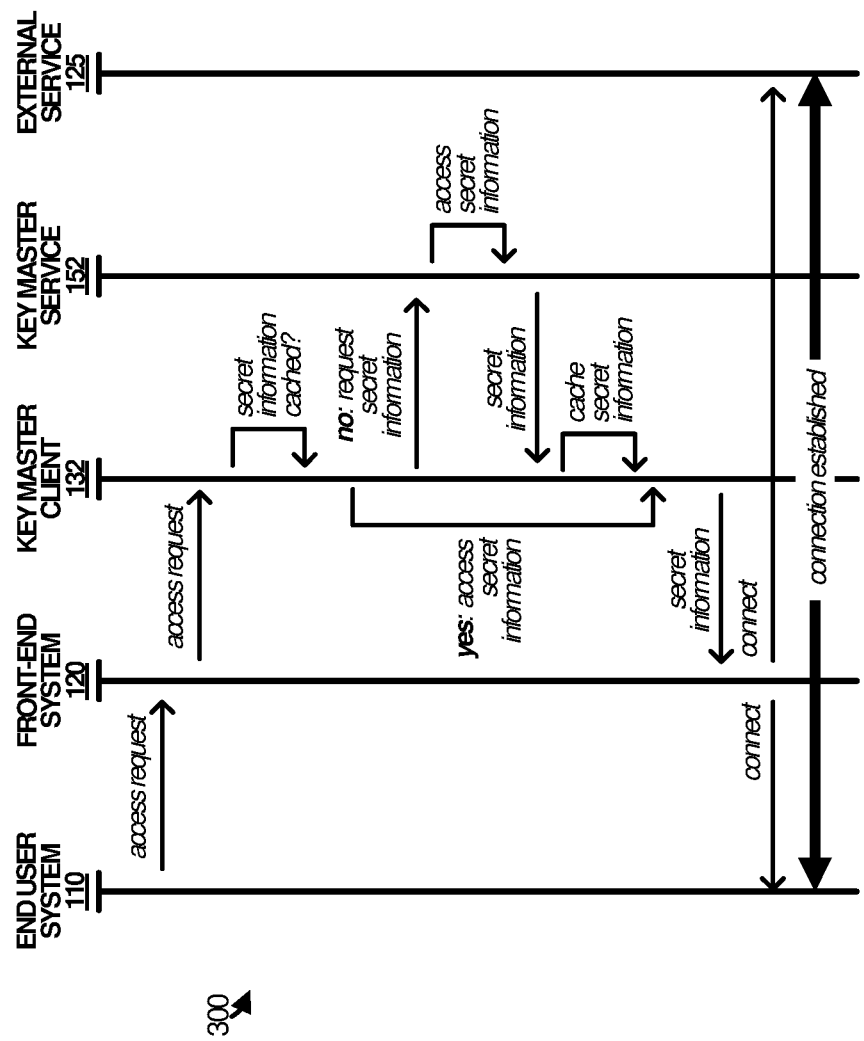
FIG. 3 depicts a sequence diagram illustrating example operations of components of the operational architecture of FIG. 1, according to some embodiments.

FIG. 3 depicts a sequence diagram 300 illustrating example operations of components of the operational architecture 100 of FIG. 1, according to some embodiments. More specifically, the example of FIG. 3 illustrates an end-user system accessing an external service using secret information provided by a hydrated key master system. As shown in the example of FIG. 3, sequence diagram 300 includes end user system 110, front-end system 120, key master client 132, key master system 152, and external service 125.

To begin, the end user system 110 requests access to external service 125 through front-end system 120. The front-end system 125, in turn, requests access to external service 125 from a key master client 132 running on a mid-tier system. The key master client 132 determines whether secret information necessary for accessing the external service 125 is cached. If so, the key master client 132 accesses the secret information and provides the secret information to the front-end system 120. As discussed herein, the key master client 132 can cache received secret information until, for example, the mid-tier system on which the client is running reboots or new data is available from a KMS system. The key master clients only have needed (requested and received) secret information, i.e., key master clients do not have all secret information.

If the secret information is not cached by the key master client 132, then the key master client 132 requests the secret information from a KMS system 152. As discussed above, the KMS systems in each key master deployment can include secret information for an entire site or external service 125. Responsive to receiving the request, KMS 125 accesses the requested secret information and provides the secret information to the key master client 132. The key master client 132 caches the requested secret information and provides the secret information to the front-end system 120. The front-end system 120 connects the end-user system 110 to the external system 125 and a connection is established.

Figure 4:
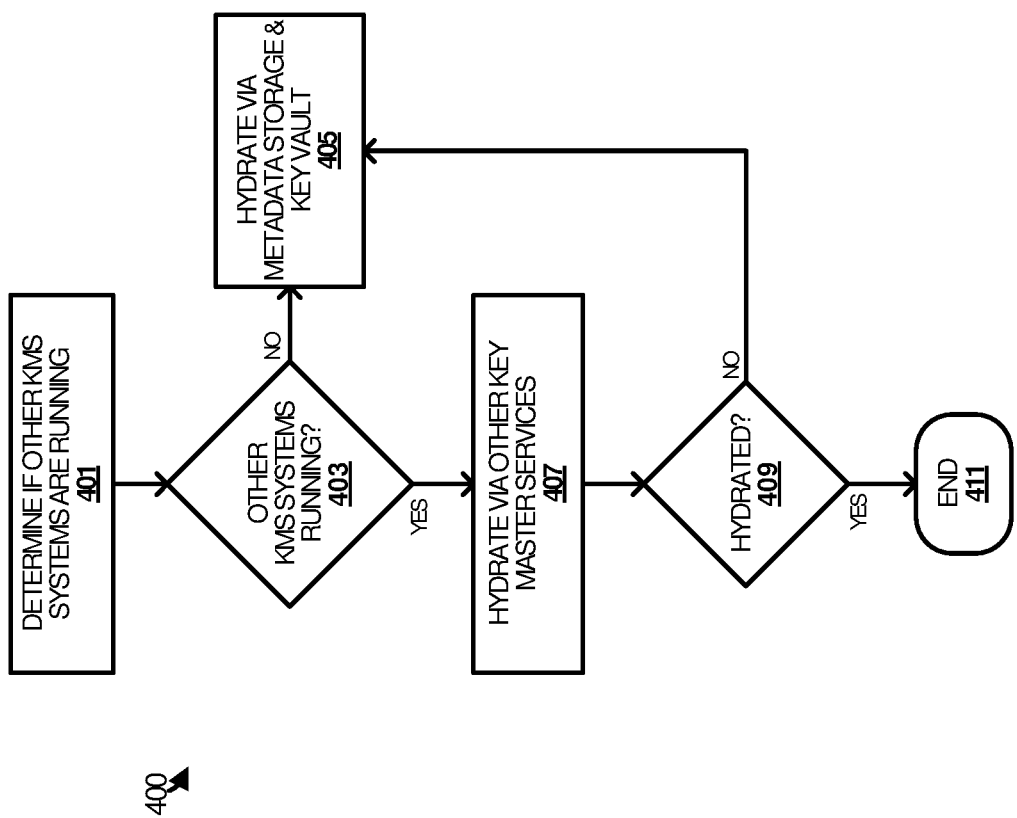
FIG. 4 depicts a flow diagram illustrating an example operational scenario for hydrating a KMS system after initiation (or restart) in accordance with some embodiments.

FIG. 4 depicts a flow diagram illustrating an example operational scenario 400 for hydrating a KMS system after initiation (or restart) in accordance with some embodiments. The example operations 400 may be performed in various embodiments by a KMS system 152 of FIG. 1, or one or more processors, modules, engines, components or tools executing a KMS system.

Typically, when a machine wakes up and needs data, it goes to the source of the data. The techniques discussed herein allow the machine to access data from any number of sources once an initial 'seed' is planted, e.g., once at least one KMS system is hydrated, other KMS systems can use that 'seed' to hydrate themselves and then other KMS systems. The techniques discussed herein describe hydrating first from other KMS systems that are already hydrated. Among other benefits, this process limits the number of instances of the backend service, e.g., key vault and metadata storage service, that are needed. For example, the more KMS systems (or instances) that are calling the key vault and the metadata storage service, the more backend instances and endpoints are needed. Reducing the calls to the backend reduces the backend footprint while improving overall availability and reliability of the infrastructure.

To begin, at 401, the KMS system determines if other KMS systems are running. For example, the other KMS systems could be local (within the same key master deployment) or remote (within a different key master deployment). At decision 403, if other KMS systems are not running, then at 405, the KMS system hydrates (or attempts to hydrate) from the metadata storage service and key vault. As discussed herein, the process of hydration includes obtaining secret information from the key vault and metadata information associated with the secret information from the metadata store for all applications, services or sites that are served by the highly available (HA) and reliable secret storage and distribution infrastructure.

However, if other KMS systems are running then, at 407, the KMS system attempts to hydrate via one or more of the other KMS systems. For example, the KMS system first attempts to hydrate via local KMS systems (within the same key master deployment) and then attempts to hydrate via remote KMS systems (within different key master deployments). An example of hydrating via one or more of the other KMS systems is shown and discussed in greater detail with reference to FIG. 6.

At decision 409, the KMS system decides whether the system is properly hydrated, e.g., whether the system has obtained necessary secret information from the key vault and metadata information associated with the secret information from the metadata store for all applications, services or sites that are served by the KMS system. If the KMS system is properly hydrated, the process ends. However, if the KMS system is not properly hydrated, the KMS system attempts to obtain the necessary secret information from the key vault and metadata information associated with the secret information from the metadata store.

Figure 5:
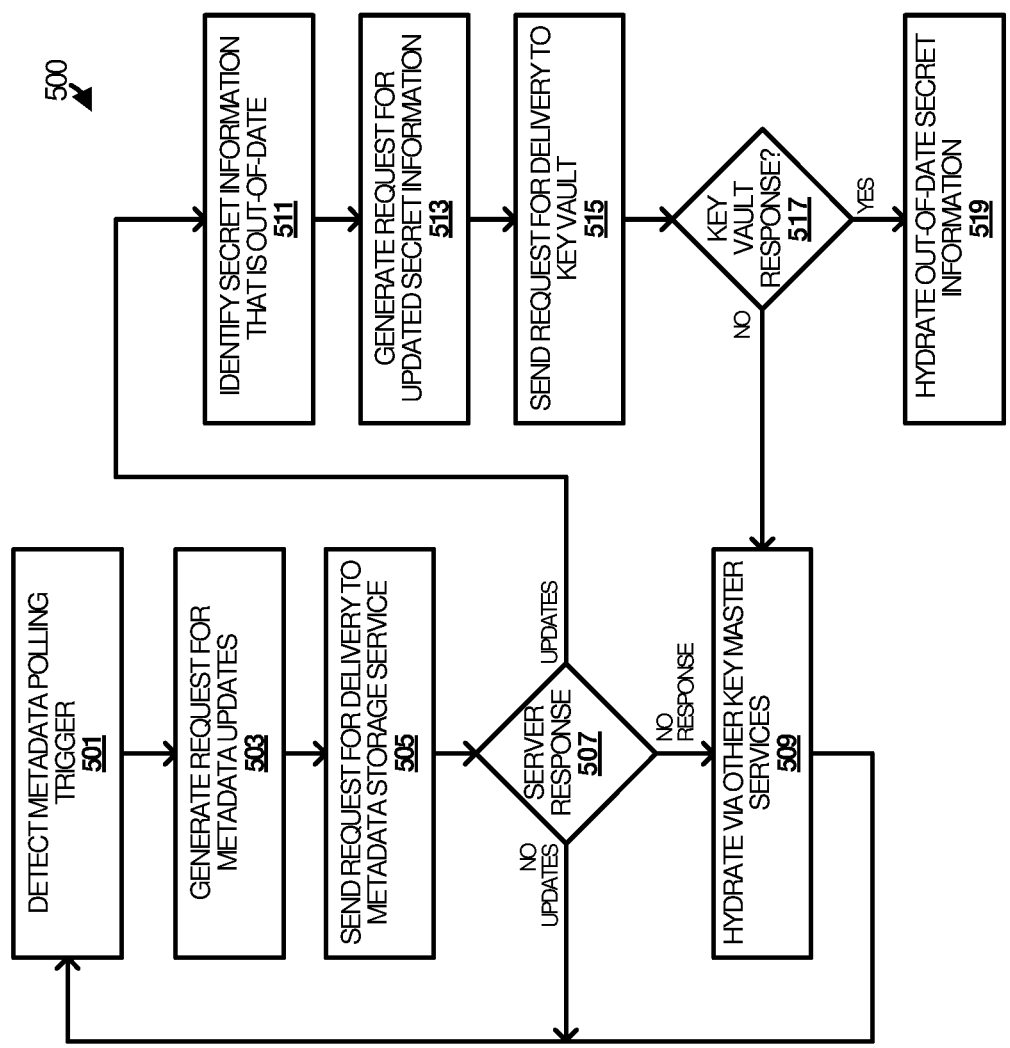
FIG. 5 depicts a flow diagram illustrating an example operational scenario for maintaining hydration of a KMS system through polling operations in accordance with some embodiments.

FIG. 5 depicts a flow diagram illustrating an example operational scenario 500 for maintaining hydration of a KMS system through polling operations in accordance with some embodiments. The example operations 500 may be performed in various embodiments by a KMS system of FIG. 1, or one or more processors, modules, engines, components or tools executing a KMS system.

Each KMS system can include one or more timers, etc., that periodically poll metadata stores of the metadata storage service for updates to secret information (or secrets). At 501, the KMS system detects a metadata polling trigger. The polling trigger can occur periodically, based on some triggering event or based on some combination or variation thereof. As discussed herein, every secret in the metadata storage service has a unique token or sequence number that identifies a state or version of the secret. In some instances, the token or sequence number increases each time the secret information is updated. Accordingly, if metadata storage service or another KMS system has a token (or sequence number) that is higher than the current token (or sequence number) that a KMS system has for a particular secret, then KMS system knows that its version of the secret information is out-of-date.

In response to the metadata polling trigger, at 503, the KMS system generates a request for metadata updates. At 505, the KMS system sends the request for metadata updates to a storage server of a metadata storage service, e.g., storage server 162 of FIG. 1. At decision 507, the KMS system determines a what type of response is received from the metadata storage service server. If no response is received, e.g., the metadata storage servers are inaccessible or down, then the KMS system, at 309, attempts to update the secret information via other local KMS systems. If the local systems do not have the up-to-date secrets, then the KMS system can attempt to update the secret information via remote KMS systems. If there are updates, at 511, the KMS system identifies the secret information that is out-of-date based on the corresponding metadata. At 513, the KMS system generates a request for updated secret information and, at 515, sends the request for delivery to a key vault.

At decision 517, the KMS system determines if the key vault is up, e.g., if a response is received from the key vault. If no response is received, it is assumed that the key vault is down and redundant vaults are also down, the KMS system attempts to hydrate via other key master services. However, if a response is received, e.g., the key vault is up, the KMS system hydrates the out-of-date secret information with information received from the key vault.

Advantageously, if one or more components fail or go down, e.g., the metadata database or key vault, the KMS systems have the ability to speak to one another and find out which one has the most up-to-date information and eventually replicate that information around to all the other KMS systems (both local and remote).

Figure 6:
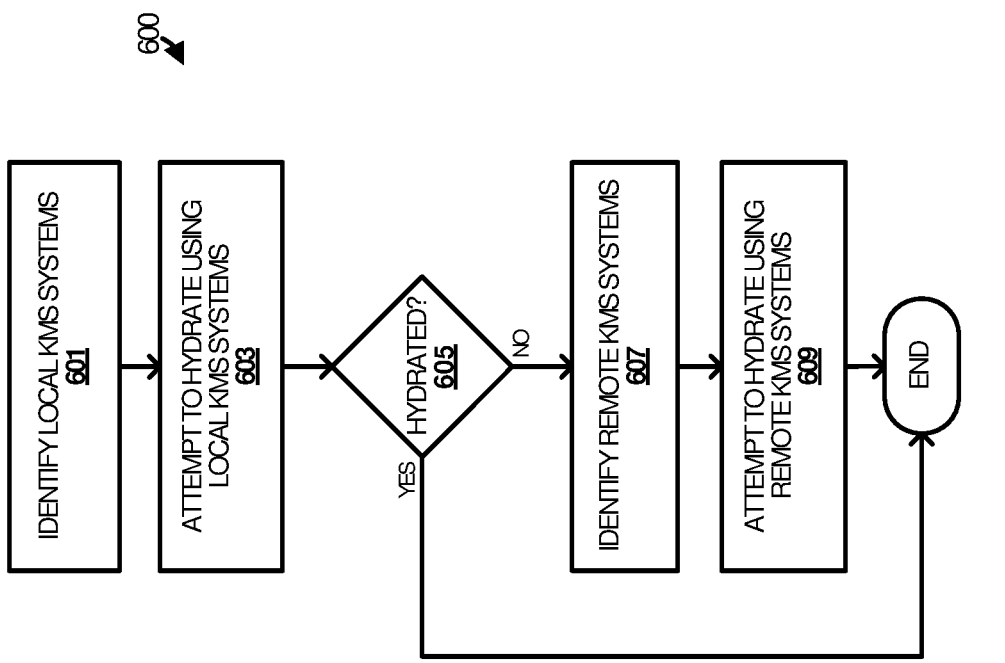
FIG. 6 depicts a flow diagram illustrating an example operational scenario for hydrating a KMS system via one or more other KMS systems in a secret distribution infrastructure, according to some embodiments.

FIG. 6 depicts a flow diagram illustrating an example operational scenario 600 for hydrating a KMS system via one or more other KMS systems in a secret distribution infrastructure, according to some embodiments. The example operations 600 may be performed in various embodiments by a KMS system of FIG. 1, or one or more processors, modules, engines, components or tools executing a KMS system.

To begin, at 601, the KMS system identifies local KMS systems within a same deployment. At 603, the KMS system attempts to hydrate using local KMS systems. At decision 605, the KMS system determines whether the system is properly hydrated, e.g., whether the system has obtained necessary secret information from the key vault and metadata information associated with the secret information from the metadata store for all applications, services or sites that are served by the KMS system. If the KMS system is properly hydrated, the process ends. However, if the KMS system is not properly hydrated, the KMS system, at 607, identifies remote KMS systems in different deployments than the KMS system and, at 609, attempts to hydrate using the remote KMS systems.

Figure 7:
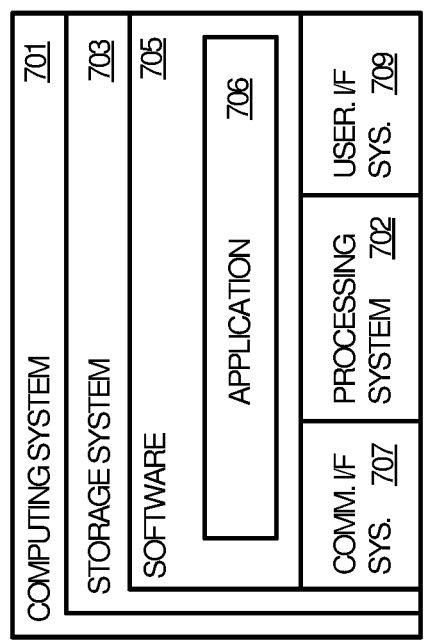
FIG. 7 is a block diagram illustrating a computing system suitable for implementing the technology disclosed herein, including any of the applications, architectures, elements, processes, and operational scenarios and sequences illustrated in the Figures and discussed below in the Technical Disclosure.

FIG. 7 illustrates computing system 701, which is representative of any system or collection of systems in which the various applications, services, scenarios, and processes disclosed herein may be implemented. For example, computing system 701 may include server computers, blade servers, rack servers, and any other type of computing system (or collection thereof) suitable for carrying out the enhanced collaboration operations described herein. Such systems may employ one or more virtual machines, containers, or any other type of virtual computing resource in the context of supporting enhanced group collaboration.

Computing system 701 may be implemented as a single apparatus, system, or device or may be implemented in a distributed manner as multiple apparatuses, systems, or devices. Computing system 701 includes, but is not limited to, processing system 702, storage system 703, software 705, communication interface system 707, and user interface system 709. Processing system 702 is operatively coupled with storage system 703, communication interface system 707, and an optional user interface system 709.

Processing system 702 loads and executes software 705 from storage system 703. When executed by processing system 702 for deployment of scope-based certificates in multi-tenant cloud-based content and collaboration environments, software 705 directs processing system 702 to operate as described herein for at least the various processes, operational scenarios, and sequences discussed in the foregoing implementations. Computing system 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device, but may also be distributed across multiple processing devices or sub-systems that cooperate in executing program instructions. Examples of processing system 702 include general purpose central processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device, but may also be implemented across multiple storage devices or sub-systems co-located or distributed relative to each other. Storage system 703 may comprise additional elements, such as a controller, capable of communicating with processing system 702 or possibly other systems.

Software 705 may be implemented in program instructions and among other functions may, when executed by processing system 702, direct processing system 702 to operate as described with respect to the various operational scenarios, sequences, and processes illustrated herein. For example, software 705 may include program instructions for directing the system to perform the processes described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtual machine software, or application software. Software 705 may also comprise firmware or some other form of machine-readable processing instructions executable by processing system 702.

In general, software 705 may, when loaded into processing system 702 and executed, transform a suitable apparatus, system, or device (of which computing system 701 is representative) overall from a general-purpose computing system into a special-purpose computing system. Indeed, encoding software on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 709 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 709. In some cases, the input and output devices may be combined in a single device, such as a display capable of displaying images and receiving touch gestures. The aforementioned user input and output devices are well known in the art and need not be discussed at length here. In some cases, the user interface system 709 may be omitted when the computing system 701 is implemented as one or more server computers such as, for example, blade servers, rack servers, or any other type of computing server system (or collection thereof).

User interface system 709 may also include associated user interface software executable by processing system 702 in support of the various user input and output devices discussed above. Separately or in conjunction with each other and other hardware and software elements, the user interface software and user interface devices may support a graphical user interface, a natural user interface, or any other type of user interface, in which a user interface to a productivity application may be presented.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Certain inventive aspects may be appreciated from the foregoing disclosure, of which the following are various examples.

What is claimed is:

1. A key master service (KMS) system configured to service requests initiated by a plurality of key master clients in a secret distribution infrastructure, the KMS system comprising:

one or more non-transitory computer readable storage media; and program instructions, stored on the one or more computer readable storage media, to facilitate maintaining hydration of the KMS system, wherein the program instructions, when executed by one or more processing systems, direct the one or more processing systems to:

in response to a metadata polling trigger,
send a request for metadata updates to a metadata storage service;

process a response to the request for metadata updates to identify secret information that is out-of-date due to a hydration event comprising one or more of an instantiation and a restart of the KMS system;

responsive to the hydration event, determine an availability of a second KMS system in the secret distribution infrastructure;

determine a secret information source from which to obtain the updated secret information to hydrate the KMS system based on the availability of the second KMS system, obtain the updated secret information from the determined secret information source; and hydrate the KMS system with the updated secret information.

2. The KMS system of claim 1, wherein the updated secret information is obtained from the second KMS system when the second KMS system is available in the secret distribution infrastructure and the updated secret information is obtained from a key vault and the metadata storage service when the second KMS system is not available in the secret distribution infrastructure.

3. The KMS system of claim 2, wherein to determine the availability of the second KMS system, the program instructions when executed by the one or more processing systems, further direct the one or more processing systems to:
identify one or more local KMS systems within a same deployment as the KMS system; and
determine if at least one of the one or more local KMS systems is available to act as the second KMS system.

4. The KMS system of claim 3, wherein the program instructions, when executed by the one or more processing systems, further direct the one or more processing systems to:
responsive to determining that the one or more local KMS systems are unavailable to act as the second KMS system, identify one or more remote KMS systems within different deployments than the KMS system; and
determine if at least one of the one or more remote KMS systems is available to act as the second KMS system.

5. The KMS system of claim 1, wherein the program instructions, when executed by the one or more processing systems, further direct the one or more processing systems to:
when a response to the request for metadata updates is not received from the metadata storage service:
identify one or more local KMS systems within a same deployment as the KMS system;
request metadata from the one or more local KMS systems;
based on the metadata, determine that the secret information is out-of-date; and
attempt to hydrate the KMS system with updated secret information obtained from the one or more local KMS systems.

6. The KMS system of claim 5, wherein the program instructions, when executed by the one or more processing systems, further direct the one or more processing systems to:
responsive to determining that the KMS system is unable to hydrate with updated secret information obtained from at least one of the one or more local KMS systems,
identify one or more remote KMS systems within different deployments than the KMS system;
request metadata from the one or more remote KMS systems;
based on the metadata, determine that the secret information is out-of-date; and
attempt to hydrate the KMS system with the updated secret information obtained from the one or more remote KMS systems.

7. The KMS system of claim 1, wherein the secret information comprises one or more of certificates, passwords, keys, logins, and domain accounts.

8. The KMS system of claim 1, wherein the key master clients are configured to provide end-user systems with access to external services.

9. A method of hydrating a key master service (KMS) system in a secret distribution infrastructure, the method comprising:
in response to detecting a metadata polling trigger, sending a request for metadata updates;
processing a response to the request for metadata updates to identify secret information that is out-of-date
due to a hydration event comprising one or more of an instantiation and a restart of the KMS system;
responsive to the hydration event, determining an availability of a second KMS system in the secret distribution infrastructure;
determining a secret information source from which to obtain updated secret information to hydrate the KMS system based on the availability of the second KMS system;
obtaining the updated secret information from the determined secret information source; and
hydrating the KMS system with the obtained updated secret information.

10. The method of claim 9, wherein the updated secret information is obtained from the second KMS system when the second KMS system is available in the secret distribution infrastructure and the updated secret information is obtained from a key vault and a metadata storage service when the second KMS system is not available in the secret distribution infrastructure.

11. The method of claim 10, wherein determining the availability of the second KMS system comprises:
identifying one or more local KMS systems within a same deployment as the KMS system; and
determining if at least one of the one or more local KMS systems is available to act as the second KMS system.

12. The method of claim 11, further comprising:
responsive to determining that the one or more local KMS systems are unavailable to act as the second KMS system, identifying one or more remote KMS systems within different deployments than the KMS system; and
determining if at least one of the one or more remote KMS systems is available to act as the second KMS system.

13. The method of claim 9, further comprising:
when a response to the request for metadata updates is not received from a metadata storage service:
identifying local KMS systems within a same deployment as the KMS system;
requesting metadata from the local KMS systems; and
when the secret information is out-of-date, attempting to hydrate the KMS system with the updated secret information obtained from one or more of the local KMS systems.

14. The method of claim 13, further comprising:
responsive to determining that the KMS system was unable to hydrate with the updated secret information obtained from the one or more of the local KMS systems:
identifying remote KMS systems within a different deployment than the KMS system;
requesting metadata from the remote KMS systems; and
when the secret information is out-of-date, attempting to hydrate the KMS system with the updated secret information obtained from the one or more of the remote KMS systems.

15. The method of claim 9, wherein the secret information comprises one or more of certificates, passwords, keys, logins, and domain accounts.

16. A secret distribution infrastructure comprising:
multiple key vaults that redundantly store secret information associated with an external service;

a metadata storage service that stores metadata associated with secret information; and multiple key master deployments each including a plurality of KMS systems that service requests from a plurality of key master clients, wherein at least one KMS system of the plurality of KMS systems is configured to:

detect a metadata polling trigger;

in response to the metadata polling trigger, generate a request for metadata updates;

send the request for metadata updates to the metadata storage service; and when a response to the request for metadata updates is received from the metadata storage service:

process the response to the request for metadata updates to identify secret information that is out-of-date; and hydrate the at least one KMS system with updated secret information obtained from a key vault;

wherein the at least one KMS system is further configured to:

when a response to the request for metadata updates is not received from the metadata storage service:

identify one or more local KMS systems within a same deployment as the at least one KMS system; and attempt to hydrate the at least one KMS system with the updated secret information obtained from the one or more local KMS systems.

17. The secret distribution infrastructure of claim 16, wherein to attempt to hydrate the at least one KMS system with the updated secret information obtained from the one or more KMS systems, the at least one KMS system is further configured to:

responsive to detecting an inability to hydrate with the updated secret information obtained from the one or more local KMS systems:

identify one or more remote KMS systems within different deployments than the at least one KMS system; and attempt to hydrate with the updated secret information obtained from the one or more remote KMS systems.

* * * * *